(12) United States Patent
Ariaz et al.

(10) Patent No.: US 7,490,434 B2
(45) Date of Patent: Feb. 17, 2009

(54) TIDAL AREA INSECT CONTROL METHOD

(76) Inventors: Danny L. Ariaz, 7575 Tamra Dr., Reno, NV (US) 89506; Scott E. Monsen, 17170 W. Opal Ct., Reno, NV (US) 89506

( * ) Notice: Subject to any disclaimer, the term of this patent is extended or adjusted under 35 U.S.C. 154(b) by 0 days.

(21) Appl. No.: 11/320,146

(22) Filed: Dec. 28, 2005

(65) Prior Publication Data

US 2007/0144057 A1    Jun. 28, 2007

(51) Int. Cl.
*A01M 17/00* (2006.01)
(52) U.S. Cl. ...................... 43/132.1; 111/118
(58) Field of Classification Search ............... 43/132.1; 111/118, 120, 124
See application file for complete search history.

(56) References Cited

U.S. PATENT DOCUMENTS

| | | | | |
|---|---|---|---|---|
| 1,204,772 A | * | 11/1916 | Hornecker | 111/120 |
| 3,162,152 A | * | 12/1964 | Regenstein, Jr. et al. | 111/118 |
| 4,799,831 A | | 1/1989 | Ariaz | |
| 5,259,327 A | * | 11/1993 | Thompson et al. | 111/118 |
| 5,357,883 A | * | 10/1994 | Depault | 111/118 |
| 6,029,590 A | * | 2/2000 | Arriola et al. | 111/124 |
| 6,167,821 B1 | * | 1/2001 | Beggs | 111/124 |
| 6,220,191 B1 | * | 4/2001 | Peter | 111/118 |
| 2002/0148396 A1 | * | 10/2002 | Allan et al. | 111/118 |

OTHER PUBLICATIONS

Arro Gun Spray Systems, LLC, Brochure, published before Dec. 2004.

* cited by examiner

*Primary Examiner*—Kurt Rowan
(74) *Attorney, Agent, or Firm*—James F. Hann; Haynes Beffel & Wolfeld

(57) ABSTRACT

A target insect in a tidal area is controlled by: choosing a treatment area in a tidal area; selecting an appropriate control agent; determining an appropriate depth below the surface of the treatment area for the delivery of the control agent; determining an appropriate application rate; and delivering the appropriate control agent to at least a portion of the treatment area at the appropriate depth and at the appropriate rate. Treatment may be directed at the larval stage of the target insect with the treatment area between a mean lower low tide demarcation and a mean higher high tide demarcation. The control agent may be delivered through passageways extending along a plurality of downwardly and rearwardly extending agent delivery knives.

2 Claims, 3 Drawing Sheets

TIDAL AREA INSECT CONTROL METHOD

CROSS-REFERENCE TO OTHER APPLICATIONS

None.

FEDERALLY SPONSORED RESEARCH OR DEVELOPMENT

None.

BACKGROUND OF THE INVENTION

Effective control of sand flies assumes increased importance when insect populations are not controlled, and especially when allowed to increase, in areas frequented by larger numbers of people or animals, such as in resort areas. Rainfall, tidal intrusion and fluctuations may significantly increase pestiferous insect populations. Inadequate control measures coupled with an influx of visitors increase human/insect interactions increasing the level of nuisance. In some instances, those people who are sensitive or are allergic, view biting flies as an added psychological burden. Regardless of personal tolerance levels to biting flies, the tranquility of any beach front property is shattered when residents or guests are assaulted by swarms of these blood-feeding insects.

BRIEF SUMMARY OF THE INVENTION

The present invention is directed to methods for sand fly control within tidal areas. Tidal areas are those areas that are periodically covered by water and exposed to the air due to the rising and falling of tides. The tidal areas may be along a beach or in other areas such as mud flats.

The present invention is directed to a method for controlling a target insect in a tidal area comprising the following steps: (a) choosing a treatment area in a tidal area for a target insect; (b) selecting an appropriate control agent for the target insect; (c) determining an appropriate depth below the surface of the treatment area for the delivery of the control agent; (d) determining an appropriate application rate for the control agent; and (e) delivering the appropriate control agent to at least a portion of the treatment area at the appropriate depth and at the appropriate rate. In some embodiments in the treatment area choosing step is carried out for the larval stage of the target insect. The treatment area may be found between a mean lower low tide demarcation and a mean higher high tide demarcation. The control agent may be a liquid or a flowable solid control agent. The control agent may be delivered through passageways extending along a plurality of downwardly and rearwardly extending agent delivery knives, and out of the passageways through at least one exit opening. The control agent delivering step may be carried out using an agent application system comprising: a vehicle; an applicator frame assembly coupled to the vehicle, the applicator frame assembly comprising downwardly and rearwardly extending agent delivery knives; and a control agent delivery system supported by at least one of the vehicle and the applicator frame assembly, the control agent delivery system comprising agent delivery passageways having at least one exit opening along the agent delivery knives through which the control agent passes.

Various features and advantages of the invention will appear from the following description in which the preferred embodiments have been set forth in detail in conjunction with the accompanying drawings.

DETAILED DESCRIPTION OF THE INVENTION

The following description of the invention will typically be with reference to specific structural embodiments and methods. It is to be understood that there is no intention to limit the invention to the specifically disclosed embodiments but that the invention may be practiced using other features, elements, methods and embodiments.

Figure 1:
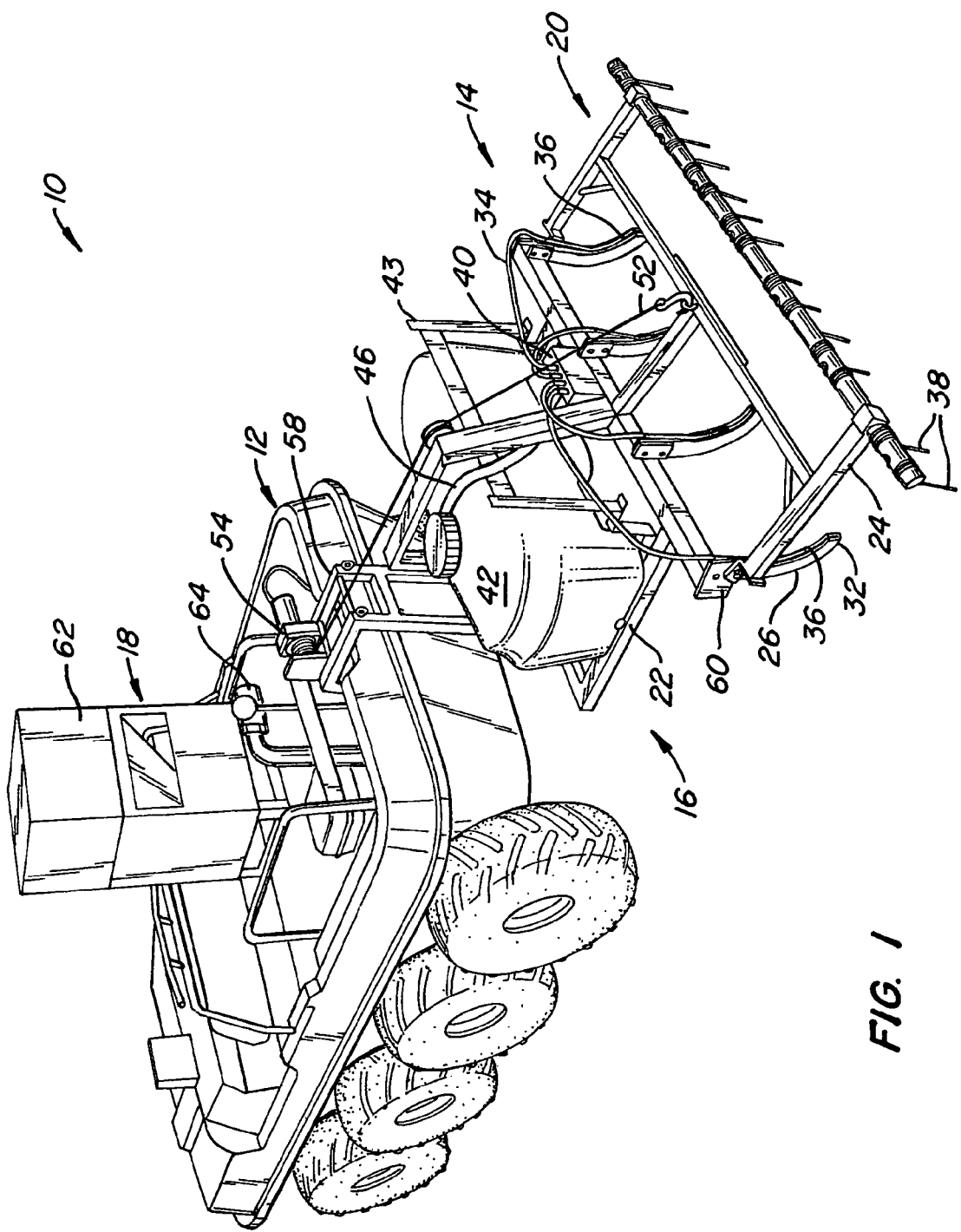
FIG. 1 is an overall top, rear, left side view of an agent application system used to apply a control agent to a tidal area to control a target insect.
Figure 2:
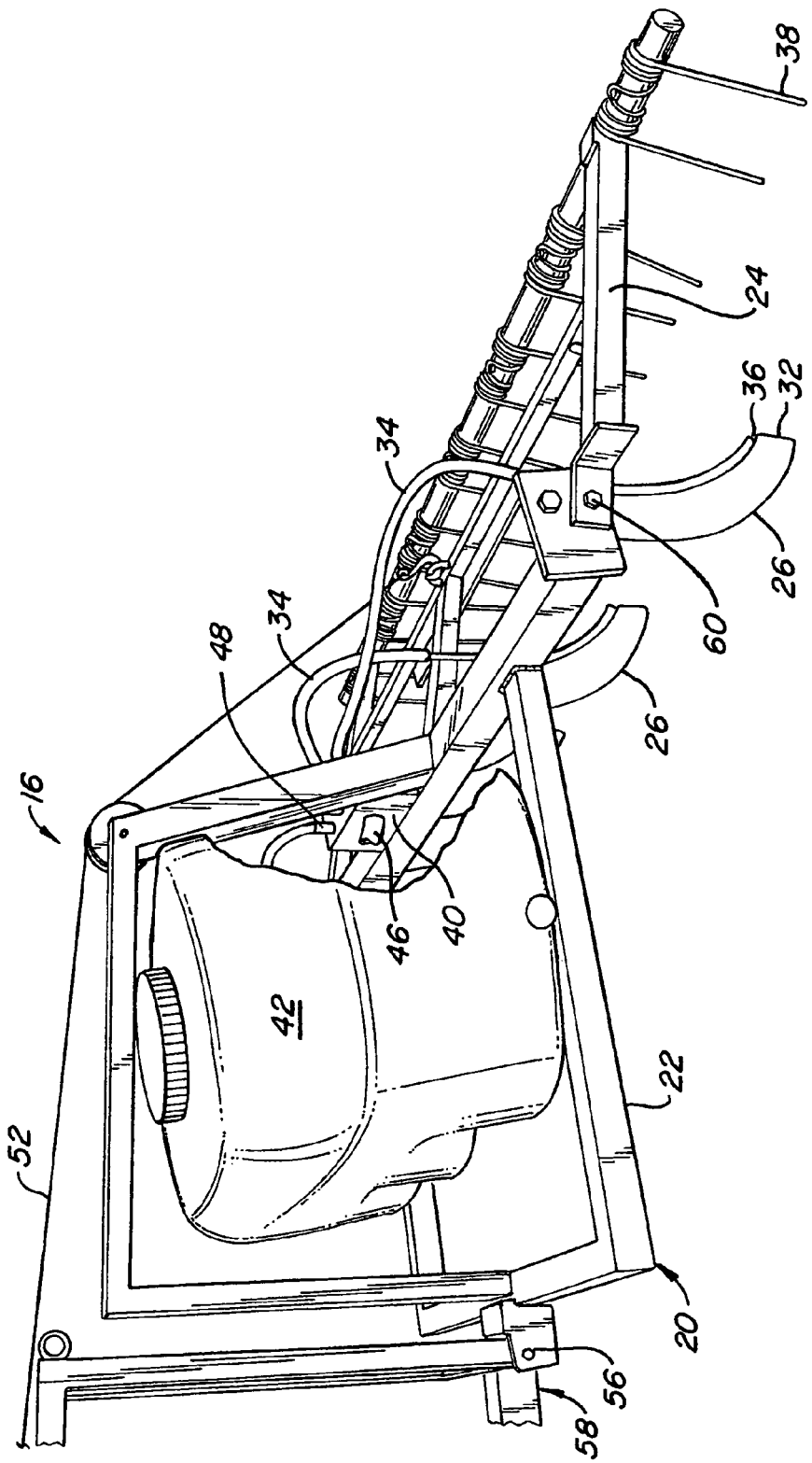
FIG. 2 is a left side, top, front view of the application frame assembly of FIG. 1.

FIGS. 1 and 2 illustrate an agent application system 10 comprising broadly a vehicle 12, an applicator frame assembly 14 secured to and pulled by the vehicle, and two different types of control agent delivery systems. The first type of control agent delivery system is liquid control agent delivery system 16 mounted to and carried by frame assembly 14. The other type of control agent delivery system is a flowable solid control agent delivery system 18 supported by vehicle 12.

Figure 3:
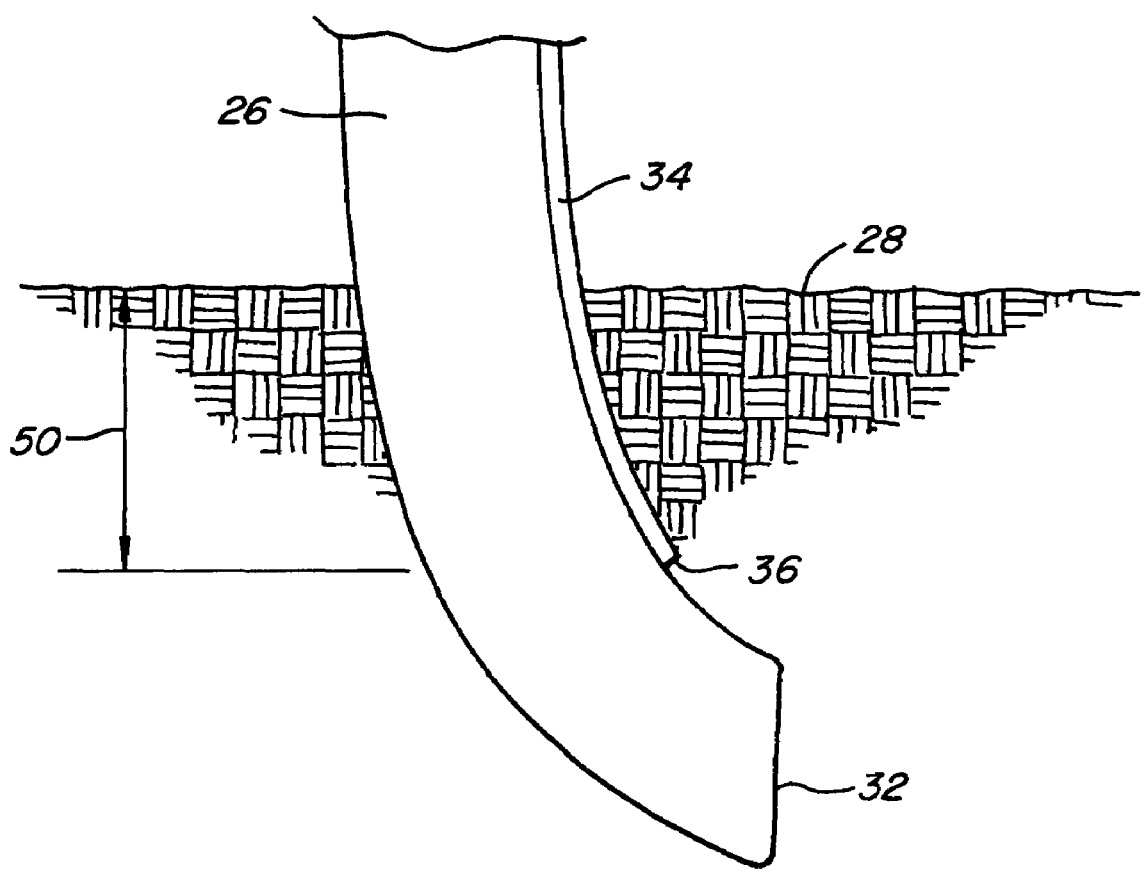
FIG. 3 is a simplified side cross-sectional view illustrating a portion of an agent delivery knife extending beneath the surface of a tidal area.

Frame assembly 14 comprises a frame 20 including a front portion 22 and a rear portion 24. Liquid control agent delivery system 16 is mounted to front portion 22. A set of rearwardly swept agent delivery knives 26 are secured to rear portion 24 and extended downwardly and rearwardly from the rear portion. Agent delivery knives 26 are configured to extend below the surface 28 of a tidal area so that the distal end or tip 32 extends below surface 28. See FIG. 3. Although agent delivery knives 26 preferably have the rearwardly swept shape illustrated, knives 26 could also have other downwardly and rearwardly extending configurations, such as straight, doglegged (two straight sections joined at an angle), or a combination of straight and curved.

Tidal areas are areas in which the tide covers and uncovers the surface of the ground, be it a sandy beach, a mud flat, or other areas. Mean tidal area, as used in this application, refers to the region between the mean lower low tide demarcation and the mean higher high tide demarcation. The mean tidal areas typically contain the primary feeding zones for sand fly larvae so that the sand fly larvae are often found in great numbers in the mean tidal areas.

Applicator frame assembly 14 also comprises several tubes 34 defining passageways for the passage of a control agent therethrough. Each tube 34 has an exit opening 36, typically at the distal end of the tube. If desired tube 34 may have more than one exit opening 36, some or all of which are spaced apart from the distal end of the tube. Rear portion 24 of frame 20 also has a number of downwardly extending raking tines 38 used to rake surface 28 of the tidal area. When the tidal area is a sandy beach, this helps to smooth out the sandy surface and also helps to collect debris. Raking may also help to distribute the control agent that is delivered through tubes 34 as discussed in more detail below.

In the embodiment of FIGS. 1 and 2, tubes 34 of frame assembly 14 are connected to a liquid agent manifold 40 supported by frame 20. Manifold 40 is supplied a liquid control agent from a tank 42 of liquid control agent delivery system 16. Tank 42 is stabilized by a generally U-shaped frame 43, frame 43 not shown in FIG. 2 for clarity of illustration. Tank 42 is pressurized by a pressurization pump, not shown. Liquid control agent from tank 42 passes through a supply line 46 connecting tank 42 to manifold 40, through inlets 48 of tubes 34, through passageways formed in tubes 34 and out through exit openings 36. The depth 50 of exit opening 36 below surface 28 of the tidal area is of particular significance. That is, depth 50 is chosen to be the average or mean depth of the sand, mud, or other strata where sand fly larvae can be found. It has been found that selecting depth 50 to be about 1.5 inches to 6 inches (3.81 cm to 15.24 cm), and preferably about 3 inches (7.62 cm), is effective.

Applicator frame assembly 14 is raised and lowered using a lift cable 52 connected to a winch 54, the winch being mounted to a mounting rack 58 secured to vehicle 12. Frame assembly 14 pivots about a pivot connection 56 at a lower, outer end of mounting rack 58. In addition to using lift cable 52 to adjust depth 50, depth 50 can also be controlled by adjusting the angle between rear portion 24 and front portion 22 of frame 20 through the use of mounting bolts 60. Further, the length, number and shape of tines 38 and the angle of tines 38 relative to rear portion 24 can also be adjusted to help control depth 50.

Flowable solid control agent delivery system 18 includes a hopper 62 holding the flowable solid control agent for delivery through an outlet fitting 64. When it is desired to use a granular, or other flowable solid control agent, instead of a liquid control agent, a manifold inlet of a flowable solid manifold, not shown, is connected to outlet fitting 64. Inlets 48 of tubes 34 are connected to the flowable solid manifold to permit the flowable solid control agent to be directed through tubes 34 and out exit openings 36 passing beneath surface 28 of the tidal area. In some situations delivery system 18 can be used to disperse a control agent, often in a fine particulate or powdered form, above ground by connecting fitting 64 to a suitable distribution device. See, for example, U.S. Pat. No. 4,799,831; see also products sold by Arro-Gun Spray Systems, LLC of Reno, Nev. as Mozzie Gas Foggers and Mozzie Electric Foggers, products sold by ADAPCO of Stanford, Fla., and products sold by London Fog Incorporated of Long Lake, Minn.

In use, the mean tidal area for the area being treated is determined. Then the treatment area, typically within the mean tidal area, is chosen based upon where the primary feeding zone for the sand fly larvae, or other target insect, is or is expected to be. The treatment area may be, for example, a central portion of the mean tidal area or all of the mean tidal area. In some situations in the treatment area may encompass all or part of the mean tidal area and regions outside of the mean tidal area.

The present invention can use a wide variety of commercially available control agents. However, some embodiments use an integrated biorational control program that focuses on safe and sane use of cost effective methods and principles in accordance with the guidelines recognized by international organizations such as the Centers for Disease Control and Prevention, United States Environmental Protection Agency, and the World Health Organization. This control strategy makes it a priority to provide a harmony among sometimes competing interests, including cost and environmental factors, while achieving effective control. A fully integrated program incorporates the most effective products available that are cost effective, easy to use, environmentally friendly and compatible with the application equipment.

Balanced control methodologies are most successful when combined with naturally biodegradable materials using the most advanced technology in application techniques and equipment. Agent application system 10 can use a wide variety of control agents in either liquid or granular formulations.

A control agent that is particularly suited for controlling the larval stage of sand flies contains the active ingredient methoprene. Methoprene acts as an insect growth regulator mimic that inhibits the emergence of the adult biting form of sand flies. Methoprene-containing control agents are often preferred because of methoprene's low environmental impact with no affect on humans, fish, birds or wildlife. Methoprene-containing products are therefore is particularly suited for sensitive areas, such as public beaches. In addition, methoprene-containing products are often consistent formulations providing long-term control while saving on labor costs.

Application rates of both liquid and granular formulations of methoprene have been calculated and tested in the field. The use of methoprene-containing formulations has proven to be effective in reducing adult sand fly populations on resort properties. Methoprene-containing control agents may be applied by being delivered beneath the surface area 28 of the mean tidal area over the chosen treatment area. For example, control agents may be incorporated into a beach sand strata layer where sand fly larvae are found, such as about 7.6 cm below surface 28 of the tidal area. By presenting the control agent at the proper concentration and depth in the sand column, water movement caused by tidal fluctuations coupled with hydrostatic pressure, serve to evenly disperse the active ingredient throughout the treatment area within the tidal area, effectively providing control. Field trials to determine dosage mortality concentrations have been conducted and results have shown that application rates of Altosid Liquid Larvicide (ALL 5%) will provide effective control when applied at 6 fluid ounces per acre (439 ml per hectare). This application rate results in the concentration of the active ingredient methoprene at 7.465 ppb. Additionally, Altosid Single Brood Granules (SBG) application rates have been determined to be 10 pounds per acre (22.4 kg per hectare). Altosid products are available from Wellmark International. This application rate results in the concentration of the active ingredient methoprene at 7.407 ppb. These applications result in the concentration of the active ingredient methoprene at about 7.4 ppb. Other application rates may also be effective.

Other modification and variation can be made to the disclosed embodiments without departing from the subject of the invention as defined in following claims.

Any and all patents, patent applications and printed publications referred to above are incorporated by reference.

What is claimed is:

1. A method for controlling a sand fly in a tidal area comprising:

(a) choosing a treatment area within a mean tide zone defined by a lower low tide demarcation and a higher high tide to demarcation, the treatment area containing a primary feeding zone for the larval stage of a target insect, the target insect being a sand fly;

(b) selecting a methoprene-containing control agent for control of the target insect;

(c) selecting about 3.81 to 15.24 cm as an appropriate depth below the surface of the treatment area for the delivery of the control agent;

(d) selecting an application rate for the control agent to result in a concentration of methoprene of about 7.4 ppb; and (e) delivering the control agent to at least a portion of the treatment area at the appropriate depth and at the application rate, the control agent delivering step being carried out using an agent application system comprising:

a vehicle;

an applicator frame assembly coupled to the vehicle, the applicator frame assembly comprising rearwardly swept agent delivery knives; and a control agent delivery system supported by at least one of the vehicle and the applicator frame assembly, the control agent delivery system comprising agent delivery passageways having at least one exit opening along the agent delivery knives through which the control agent passes.

2. A method according to claim 1 wherein the appropriate depth selecting step comprises selecting about 7.6 cm as the appropriate depth.

* * * * *